UNITED STATES PATENT OFFICE.

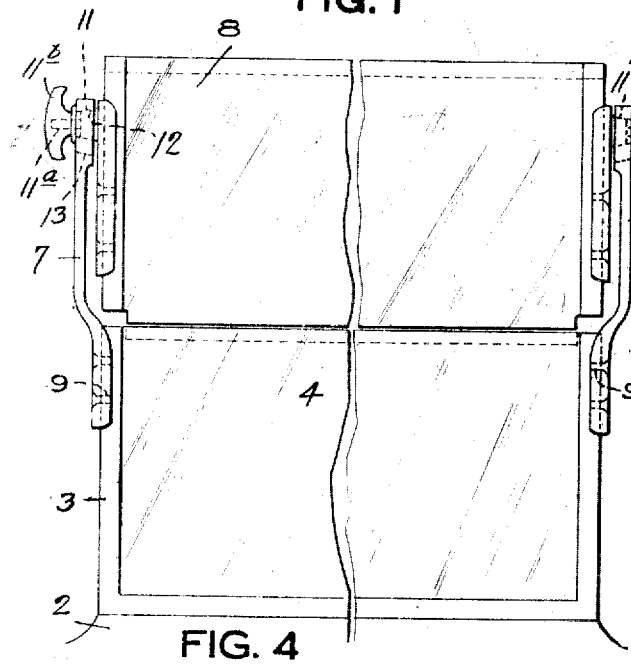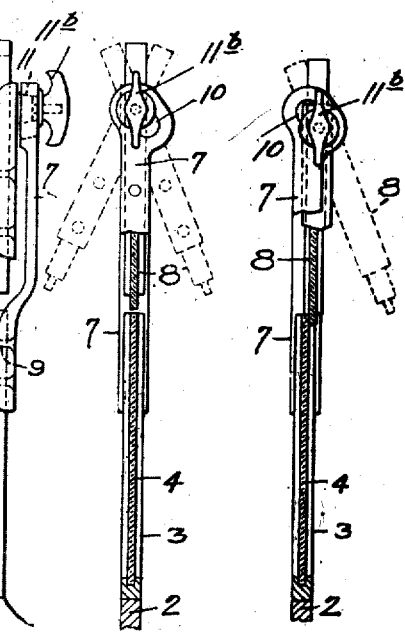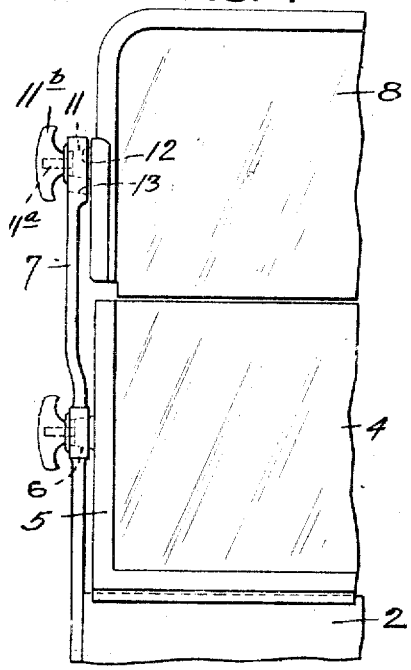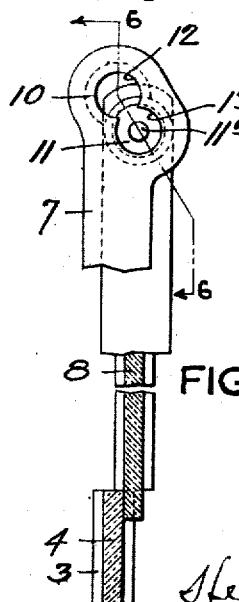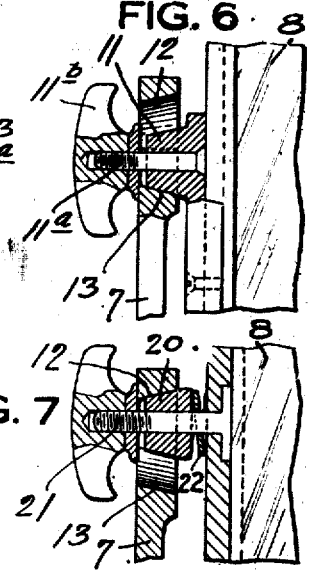

HENRY G. GODLEY, OF PITTSBURGH, PENNSYLVANIA.

VEHICLE-SHIELD.

1,266,934.	Specification of Letters Patent.	Patented May 21, 1918.

Application filed December 27, 1916. Serial No. 139,078.

*To all whom it may concern:*

Be it known that I, HENRY G. GODLEY, a citizen of the United States, and resident of Pittsburgh, in the county of Allegheny and State of Pennsylvania, have invented a new and useful Improvement in Vehicle-Shields; and I do hereby declare the following to be a full, clear, and exact description thereof.

My invention relates to shields for vehicles, commonly known as "wind shields", its object being to provide a rain and wind vision shield of this character which is adjustable to various positions toward and from the driver for ventilation, and for vision, and which is simple in structure and convenient to operate.

In ordinary types of shields which are adapted for ventilation, the shield is generally formed of two separate parts, namely, a lower section which is usually rigidly attached to the dash or cowl of the vehicle, and an upper swinging section which is trunnioned to the frame which supports the lower section. In some types the lower section is also attached so as to swing. In either case, heretofore, in which the upper section is adapted to swing inward, or toward the driver, a slight space necessarily occurs between the two sections to provide for free operation of these sections, and as the shield is usually a continuation of the dash, the space between the sections permits rain to enter with resultant inconvenience to the driver, and results in damage, especially so if the vehicle is an automobile, as instruments of the machine are usually located on the dash.

Attempts have been made to obviate this difficulty, such as providing weather strips at the junction of the two sections, and in overlapping the glass panels of the sections. In all cases, the obstruction so formed to keep out the rain, also acts to prevent inward swinging of the upper section or outward swinging of the lower section for ventilating purposes. It is desirable that the upper section particularly, be adjustable in both directions, *i. e.*, inward, toward the driver, and outward, so that draft in ventilating may also be controlled.

By the present invention I am enabled to provide a shield which permits free swinging of either section and which is adjustable to form a rain vision shield which effectively keeps out the rain.

The invention consists in the novel construction, combination and arrangement of parts hereinafter fully described.

In the accompanying drawings, Figure 1 is a front elevation of a typical wind shield employing my invention; Fig. 2 is an edge or end view of the shield, the lower panel and a portion of the upper panel being in section to show the relative position of the two parts when employed as a "wind" shield; Fig. 3 is a like section showing the relative position of the two parts when adjusted as a "rain" shield; Fig. 4 is a view similar to Fig. 1 and represents a portion of a shield with a lower swinging panel; Figs. 5 and 6 are enlarged details, part in section, of the shiftable trunnion and bracket; Fig. 7 is a modified form of the trunnion connection.

Numeral 2 represents the dash of a vehicle upon which is secured a frame 3 for the support of a glass panel 4. This panel forms the bottom section of the shield, and as shown in this figure is seated in the frame 3. In some structures this section is mounted in a separate frame 5 as shown in Fig. 4, and is provided with trunnion or bolts journaled in the frame 3 as at 6, so as to permit swinging of this section for ventilation; the lower edge of the section in this case being provided with a weatherstrip engaging the dash or frame 3.

The frame 3 is provided with arms or brackets 7 which extend up above the lower section and form a support for the upper swinging section 8 of the shield. Preferably, these brackets are made separate from the frame proper, and are adapted to be exchangeable for standard brackets of shields which do not have the advantages of my invention. These brackets are attached to the frame in this instance, as at 9. The brackets may also be formed integrally with the frame, such as the frame 3, Fig. 1, or formed in a manner as shown in Fig. 4. In all cases, the upper free end of the bracket is formed with an eye 10 for the reception of a trunnion or pivot 11 of the swinging upper section of the shield. The eye preferably is made in the form of two conical seats 12 and 13 and the trunnions or pivots of the swinging section are of conical form.

These seats are so disposed in respect to one another, and in respect to the longitudinal vertical center of the shield as to provide a bearing upon which the swinging section is supported for alining the sections when used as a swinging ventilating wind shield as in Fig. 2, and in off-set position to make the shield rain-proof as in Fig. 3. Referring to the enlarged views 5 and 6, it will be seen that the eye 10 has the upper seat 12 formed in the plane of the vertical longitudinal axis of the frame, while seat 13 is eccentric thereto, and of a lower position. The pivot of the swinging section when in engagement with the upper seat permits the swinging of the section, either toward or from the driver as indicated by dotted lines in Fig. 2, and represents the ordinary non-rain-proof position of the shield.

When it is desired to make the shield rain-proof, the pivot of the swinging section is moved to engage the seat 13 as in Fig. 3. In this position, the upper section, or glass panel overlaps the lower glass panel and closes the opening between the sections. By making the eye with intercommunicating conical seats, as shown, a bearing is provided which supports the swinging section for pivotal adjustment, and at the same time, permits lateral shifting of the pivot without entire displacement of the pivot from the bracket. Means for locking the bearing is provided by forming the cone bearing 11 with a bolt end 11ª which is engaged by a nut, preferably a thumb-nut 11ᵇ on the outside of the bracket.

In the operation of the device, when it is desired to make the shield rain-proof, the thumb-nuts are first loosened, and the upper section is then forced downwardly, play being allowed by backing off the nuts part way, which permits the conical pivots to force apart the brackets 7, allowing the cone to move through the communicating space between the seats to the lower seat with only slight displacement of the brackets. Lowering of the upper section may be accomplished also by directly springing the brackets apart without applying force to the swinging section. Other forms of pivots may be employed without departing from my invention. In Fig. 7, I have illustrated a form of pivot in which the force applied to move the section acts to move the pivot longitudinally on its axis. In this example, the conical pivot 20 is mounted to move on the clamping bolt 21, a spring 22 is interposed between the sliding pivot and the frame of the glass panel. By this arrangement the force necessary to displace the pivot is absorbed by the spring and the cone-pivot moves inwardly, relieving to a great extent the strain on the brackets 7.

From the foregoing description, it will be seen that I have provided a shield which is applicable for use as a wind and rain vision shield which is readily adjustable in a wide range of positions for ventilation and control of the air currents.

What I claim is:

1. A shield structure for vehicles comprising an upper vision section and a lower section, a fixed supporting frame for the sections, journals on the upper section, and stationary bearings formed in the frame for the reception of said journals adapted to support the upper section in alinement with the lower section, said upper section movable in said bearings to an overlapping position with the lower section.

2. A shield structure for vehicles comprising upper and lower vision sections, a fixed supporting frame, pivotal trunnions on the upper section, a fixed bearing for the trunnions in the frame having a seat adapted to support the upper section in alinement with the lower section, and having a seat adapted to support the upper section in overlapping parallel position with the other, and means for locking the sections in position.

3. A shield structure for vehicles comprising an upper vision section and a lower section, a fixed frame for the support of the lower section, stationary brackets secured to the frame for the support of the upper section, pivots on said section, said brackets forming bearings having seats adapted to receive the pivots to support the section in swinging relation with the other, and having a seat communicating with said first seat for supporting the section in overlapping parallel relation with the lower section and means for locking the pivots in the seats.

4. A shield structure for vehicles comprising upper and lower vision sections, a fixed frame for the support of the lower section, yieldable brackets fixed to the frame for the support of the upper section, conical pivots on said section, bearings formed in said brackets having conical seats adapted to receive the pivots to support said section in alinement with the lower section, and having conical seats communicating with said first seats whereby the pivots may be moved to engage said last seats for the support of the section in lowered parallel relation to said lower section, and a locking nut engaging the pivot and bracket for securing the section in position.

5. A shield structure for vehicles comprising an upper vision section and a lower section, a stationary frame for the support of the sections, longitudinally-yieldable pivots on the upper section, stationary bearings in the frame having seats for the reception of the pivots to support the section in alinement with the other section, and having communicating like seats adapted to support the section in lowered parallel position with said lower section, and means for locking the pivots in the seats to secure the section against pivotal movement.

In testimony whereof, I the said HENRY G. GODLEY, have hereunto set my hand.

HENRY G. GODLEY.

Witnesses:
JOHN F. WILL,
S. F. ARMSTRONG.